May 31, 1927. 1,631,018
J. S. CURTIS
MEANS FOR RETAINING THE DUMPING ELEMENTS OF VEHICLES
Filed Jan. 6, 1926 2 Sheets-Sheet 1
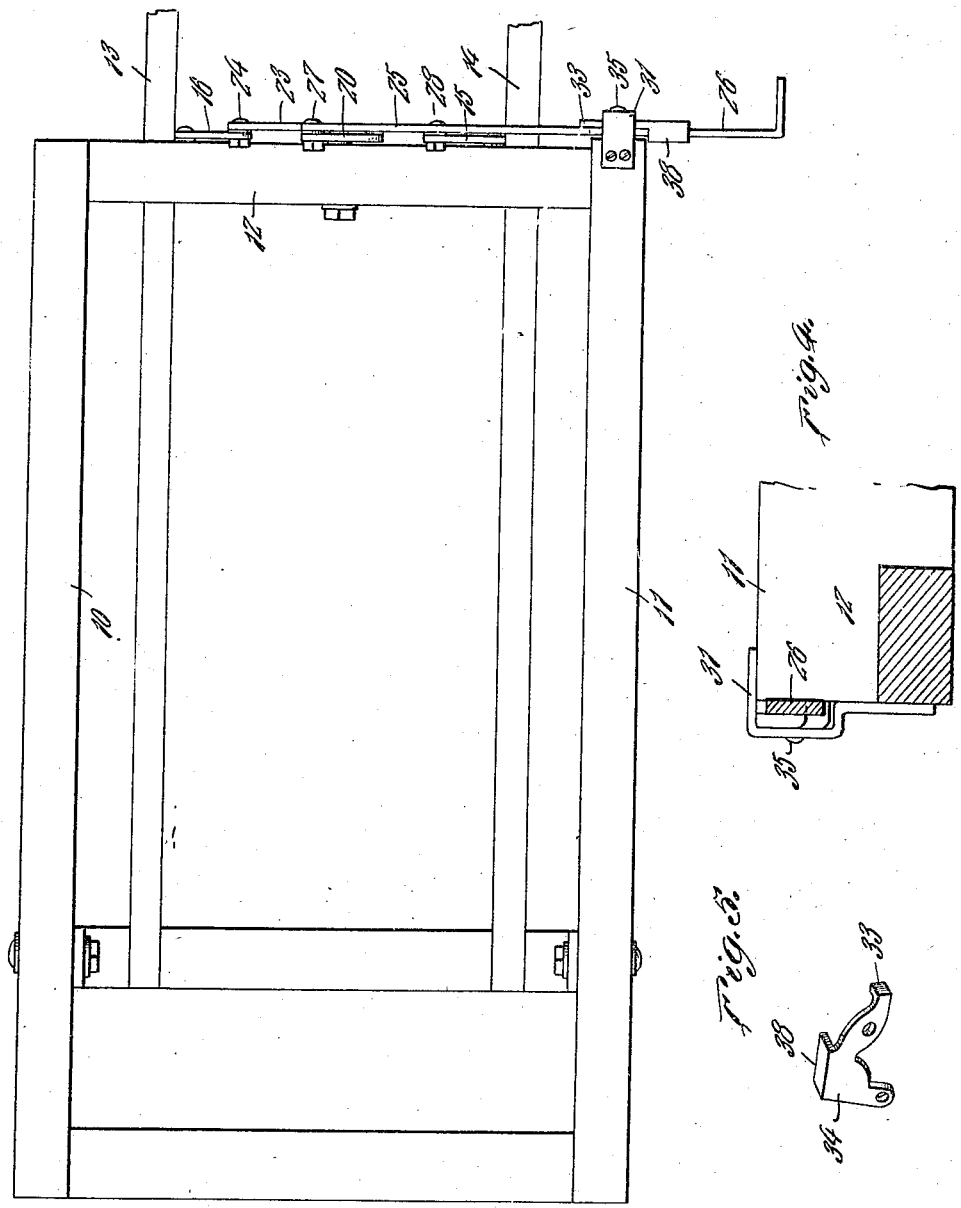

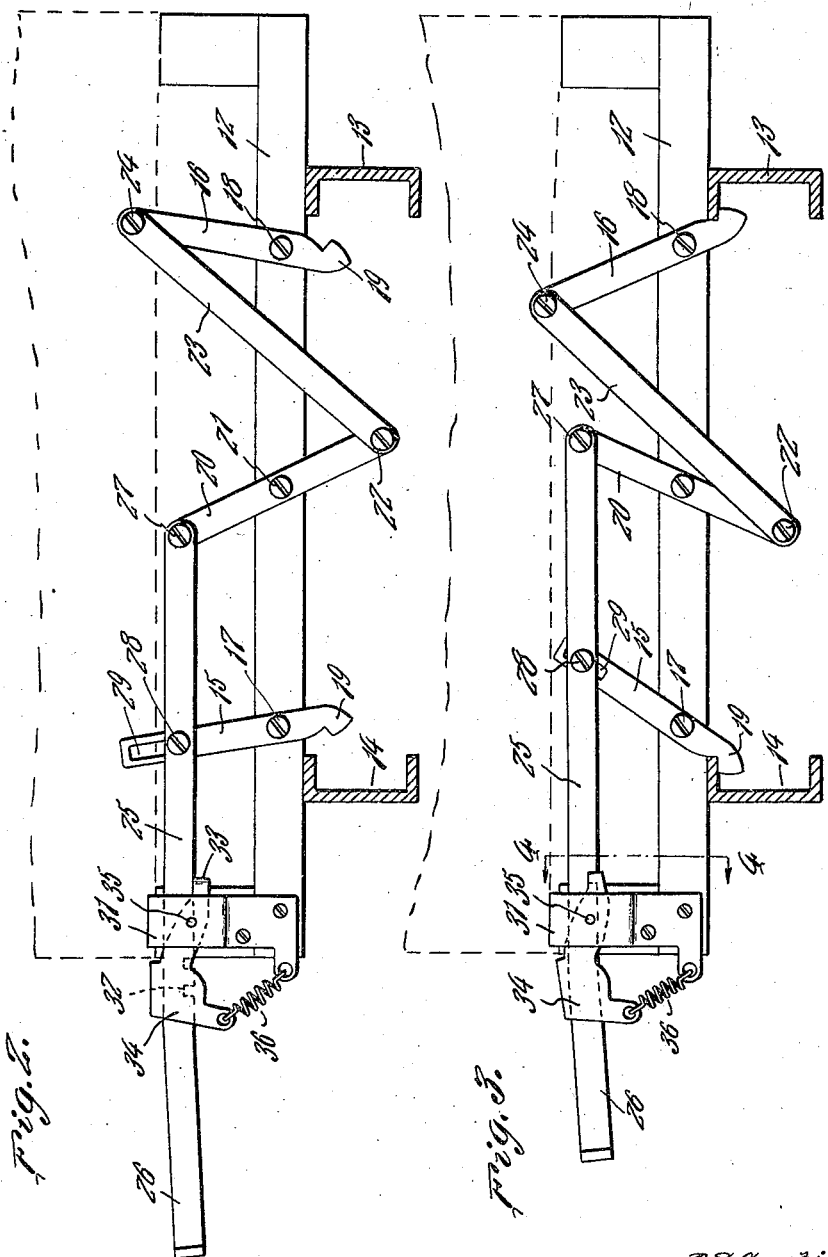

Patented May 31, 1927.

1,631,018

UNITED STATES PATENT OFFICE.

JOHN S. CURTIS, OF OAKLAND, ILLINOIS.

MEANS FOR RETAINING THE DUMPING ELEMENTS OF VEHICLES.

Application filed January 6, 1926. Serial No. 79,644.

The object of this invention is to provide for retaining and releasing the dumping body of a motor truck or other vehicle, said means including elements to be mounted on the forward end of the body, and acting, when drawn to operative position, to engage the longitudinal elements of the frame.

A further object is to provide a plurality of hook members pivotally mounted and having their engaging ends movable outwardly to locking position, upon the movement of a controlling lever.

A further object is to provide means for connecting the hook members, for moving them simultaneously in reverse directions, in order to effect the locking and unlocking operations.

With the foregoing and other objects in view, the invention consists in the novel construction and arrangement of elements described, illustrated and claimed, it being understood that modifications may be made within the scope of the claims, without departing from the spirit of the invention.

In the drawings forming part of this application,

Figure 1 shows a portion of a body conventionally, or the frame thereof, and in relation to the longitudinal channel bars, the position of the locking means being also illustrated.

Figure 2 is a view of the structure of Figure 1, chiefly in elevation, the channel bars however being shown in vertical transverse section.

Figure 3 is a view similar to Figure 2, the locking hooks in Figure 3 being in operative position.

Figure 4 is a section on line 4—4 of Figure 3.

Figure 5 is a detail view in perspective, showing means for retaining the locking lever.

The frame of the dumping element includes the side members 10 and 11, and the forward transverse element 12 to which the locking or engaging devices are attached. The longitudinal channel elements of the truck are shown at 13 and 14, and the engaging or retaining devices are adapted to move into locking connection with the upper flange of the channels.

Arms 15 and 16 are pivoted at 17 and 18 respectively, and their lower ends are formed as hooks 19, the hooks being positioned reversely, for engaging the upper flanges of the channels as indicated.

An intermediate arm 20 is pivoted at 21 on the dumping element, and on the member 12 as the arms 15 and 16 are mounted. Arm 20 is pivoted at 22 to link 23 which in turn has connection at 24 with arm 16.

A controlling lever 25 includes a handle 26, and the inner end of the lever is pivoted at 27 to arm 20, a bolt or pin 28 passing through lever 25 and through a slot 29 in arm 15.

The connection of lever 25 and link 20 permits of the control of elements 15, 20 and 16 in one operation, and permits therefore, of the movement of the hooks or locking members in engagement with the channel elements 14 and 13 simultaneously.

Lever 25 operates through a guide 31, and notches 32 in the edge of the lever are engaged by the deflected end 33 of a catch or pawl 34 pivoted at 35 and acting under the control of a spring 36. The pawl has a deflected portion 38 passing over the upper edge of lever 25, or the outer end 26 thereof, so that the pawl may be released upon moving the handle 26 to an upper position, and the moving it in an obvious manner for releasing the hooks carried by arms 15 and 16.

What is claimed is:

1. In a device of the class described, a plurality of pivotally mounted hooks having engaging portions on reverse sides thereof, means for mounting the hooks on the forward portion of a dumping element, means controlling the hooks simultaneously and causing them to engage stationary elements, for retaining the dumping element against movement, and a device for retaining and releasing the controlling means, the operation of said device being incident to the manual shifting of said controlling means.

2. In a device of the character described, a plurality of stationary elements, a dumping element mounted above the stationary elements, and means for retaining the dumping element against movement to dumping position, said means including a plurality of hooks having engaging portions turned in opposite directions for effecting locking connection with the stationary elements, an arm pivotally mounted intermediate of the hooks, a link connecting this arm with one of the hooks, a controlling lever connected with the intermediate arm and the other hook, for controlling the hooks simultaneously and moving their engaging ends in opposite directions, in one operation, and means for retaining and releasing the controlling lever the movement to release position being effected by said lever.

In testimony whereof I affix my signature.

JOHN S. CURTIS.